US008447469B2

(12) United States Patent
Colosky

(10) Patent No.: US 8,447,469 B2
(45) Date of Patent: May 21, 2013

(54) ELECTRIC POWER STEERING SYSTEM CONTROL METHODS

(75) Inventor: Mark P. Colosky, Vassar, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 729 days.

(21) Appl. No.: 12/539,133

(22) Filed: Aug. 11, 2009

(65) Prior Publication Data
US 2010/0063684 A1 Mar. 11, 2010

Related U.S. Application Data

(60) Provisional application No. 61/095,152, filed on Sep. 8, 2008.

(51) Int. Cl.
B62D 6/00 (2006.01)
B62D 11/00 (2006.01)
B62D 12/00 (2006.01)

(52) U.S. Cl.
USPC ............... 701/41; 701/42; 180/444; 180/446; 180/443

(58) Field of Classification Search
USPC 701/22, 36, 54, 58, 93, 41–42; 180/443–444, 180/446, 179; 123/350
See application file for complete search history.

(56) References Cited

U.S. PATENT DOCUMENTS

| 4,281,388 A | 7/1981 | Friend et al. |
| 4,829,254 A | 5/1989 | Baines |
| 5,305,220 A | 4/1994 | Schoggl |
| 5,740,880 A | 4/1998 | Miller |
| 5,919,241 A | 7/1999 | Bolourchi et al. |

(Continued)

FOREIGN PATENT DOCUMENTS

| GB | 2134265 A | | 8/1984 |
| JP | 10-209983 | * | 7/1998 |

(Continued)

OTHER PUBLICATIONS

Sensorless position and speed estimation with improved integrator for PMLSM drive; Huacai Lu; Manhua Li; Yuetong Xu; Information and Automation, 2009. ICIA '09. International Conference on; Digital Object Identifier: 10.1109/ICINFA.2009.5204953 Publication Year: 2009 , pp. 380-384.*

(Continued)

Primary Examiner — Cuong H Nguyen
(74) Attorney, Agent, or Firm — Cantor Colburn LLP

(57) ABSTRACT

An electric power steering system of a vehicle includes a controller for controlling an electric motor connected to a steering column or other steering mechanism. The velocity of the motor must be determined to maintain the proper current to the motor. A method of estimating the velocity includes obtaining a first and second velocity signals from one or more sensors monitoring the motor. The first and second signals have different characteristics, e.g., the first signal may have a higher resolution than the second signal. An acceleration (or deceleration) of the velocity of the electric motor is computed based on the different representations of the velocity supplied by the different signals. An estimate of the velocity of the motor is then determined based on the acceleration/deceleration and the different representations of the velocity. The electric current provided to the electric motor is then adjusted based on the estimated velocity to meet the desired motor output (i.e., motor torque and velocity).

17 Claims, 4 Drawing Sheets

U.S. PATENT DOCUMENTS

| | | | |
|---|---|---|---|
| 6,129,172 | A | 10/2000 | Yoshida et al. |
| 6,425,454 | B1 | 7/2002 | Chabaan et al. |
| 6,470,994 | B1 * | 10/2002 | Shimizu et al. ............... 180/446 |
| 6,510,396 | B1 | 1/2003 | Colosky |
| 6,658,335 | B2 | 12/2003 | Kleinau |
| 6,965,820 | B2 * | 11/2005 | Amberkar et al. .............. 701/41 |
| 7,050,896 | B2 * | 5/2006 | Tsuchiya ........................ 701/41 |
| 7,100,735 | B2 | 9/2006 | Burton et al. |
| 7,109,670 | B1 | 9/2006 | Rehm |
| 7,128,184 | B2 | 10/2006 | Satake et al. |
| 7,128,185 | B2 | 10/2006 | Satake et al. |
| 7,183,935 | B2 | 2/2007 | Golownia, Jr. et al. |
| 7,187,142 | B2 | 3/2007 | Rehm |
| 7,188,701 | B2 | 3/2007 | Patankar |
| 7,505,840 | B2 | 3/2009 | Seidel |
| 7,523,806 | B2 | 4/2009 | Krieger et al. |
| 7,542,679 | B2 * | 6/2009 | Price ............................... 398/85 |
| 7,725,227 | B2 * | 5/2010 | Pattok et al. .................... 701/41 |
| 7,832,762 | B2 * | 11/2010 | Breed ........................... 280/735 |
| 2005/0049769 | A1 * | 3/2005 | Tsuchiya ........................ 701/41 |
| 2007/0284180 | A1 * | 12/2007 | Suehiro et al. ............... 180/444 |
| 2008/0067960 | A1 * | 3/2008 | Maeda et al. ............ 318/400.02 |
| 2008/0082237 | A1 * | 4/2008 | Breed ............................ 701/45 |
| 2008/0114515 | A1 * | 5/2008 | Hara .............................. 701/42 |
| 2008/0174417 | A1 | 7/2008 | Schubert |
| 2008/0203960 | A1 * | 8/2008 | Golownia et al. ............. 318/646 |
| 2008/0217099 | A1 * | 9/2008 | Reungwetwattana et al. ............................ 180/446 |
| 2008/0243342 | A1 * | 10/2008 | Breed ............................ 701/45 |
| 2009/0000857 | A1 * | 1/2009 | Sugiyama et al. ............ 180/444 |
| 2009/0240389 | A1 * | 9/2009 | Nomura et al. ................. 701/29 |

FOREIGN PATENT DOCUMENTS

| | | | |
|---|---|---|---|
| JP | 2006-309307 | * | 11/2006 |
| JP | 2007-172005 | * | 6/2007 |
| JP | 2007-302607 | * | 11/2007 |
| WO | WO 01/20266 A2 | | 3/2001 |
| WO | WO 02/100704 A2 | | 12/2002 |
| WO | PCT/JP05/21615 | * | 4/2007 |
| WO | 2008020231 A2 | | 2/2008 |

OTHER PUBLICATIONS

The Research of Double-Driven Electric Vehicle Stability Control System; Junwei Li; Huafang Yang; Measuring Technology and Mechatronics Automation, 2009. ICMTMA '09. International Conference on; vol. 1; Digital Object Identifier: 10.1109/ICMTMA. 2009.351; Publication Year: 2009 , pp. 905-909.*

Fuzzy estimator for sensorless PMBLDC motor drive under speed reversal; Bansal, A.K.; Gupta, R.A.; Kumar, R.; Power Electronics (IICPE), 2010 India International Conference on; Digital Object Identifier: 10.1109/IICPE.2011.5728078 Publication Year: 2011 , pp. 1-7.*

The study of traction control system for Omni-directional electric vehicle; Guoying Chen; Changfu Zong; Qiang Zhang; Lei He; Mechatronic Science, Electric Engineering and Computer (MEC), 2011 International Conference on; Digital Object Identifier: 10.1109/ MEC.2011.6025780; Publication Year: 2011 , pp. 1590-1593.*

Steering and lane change: a working system; Hatipolglu, C.; Redmill, K.; Ozguner, U.; Intelligent Transportation System, 1997. ITSC '97., IEEE Conference on; Digital Object Identifier: 10.1109/ITSC.1997. 660487; Publication Year: 1997 , pp. 272-277.*

Toyota electronic modulated air suspension system for the 1986 Soarer; Hirose, M.; Matsushige, S.; Buma, S.; Kamiya, K. Industrial Electronics, IEEE Transactions on; vol. 35 , Issue: 2; Digital Object Identifier: 10.1109/41.192649; Publication Year: 1988 , pp. 193-200.*

Design of angular position and velocity observer for servo motors with reslovers; Wu Zhong; Wu Yuntao Control Conference (CCC), 2012 31st Chinese ; Publication Year: 2012 , pp. 4350-4355.*

Estimation of vehicle lateral velocity; Farrelly, J.; Wellstead, P.; Control Applications, 1996., Proceedings of the 1996 IEEE International Conference on; Digital Object Identifier: 10.1109/CCA.1996. 558920; Publication Year: 1996 , pp. 552-557.*

Time-Optimal Attitude Reorientation at Constant Angular Velocity Magnitude with Bounded Angular Acceleration; Modgalya, M.; Bhat, S.P.; Decision and Control, 2006 45th IEEE Conference on; Digital Object Identifier: 10.1109/CDC.2006.376703 Publication Year: 2006, pp. 223-228.*

Interferometric detection of the angular velocity of moving objects; Nanzer, J. A.; Microwave Symposium Digest (MTT), 2010 IEEE MTT-S International, Digital Object Identifier: 10.1109/MWSYM. 2010.5515769 Publication Year: 2010 , p. 1.*

European Search Report and Office Action dated Dec. 11, 2009 for European Application No. 09168904.2.

* cited by examiner

ELECTRIC POWER STEERING SYSTEM CONTROL METHODS

CROSS REFERENCE TO RELATED APPLICATION

This application claims the benefit of provisional patent application No. 61/095,152, filed Sep. 8, 2008, which is hereby incorporated by reference.

BACKGROUND OF THE INVENTION

1. Field of the Invention

The invention relates to electric power steering systems for vehicles.

2. Description of the Related Art

Traditionally, power steering systems have utilized hydraulics to provide assist to the driver of the vehicle. These hydraulic power steering systems typically include a hydraulic pump operatively connected to and driven by the vehicle engine. The hydraulic pump is in fluidic communication with a cylinder operatively connected to the steering column. One drawback to hydraulic power steering systems is that the hydraulic pump is always being powered by the engine, thus affecting overall fuel economy of the vehicle.

As such, electric power steering (EPS) systems have been developed and introduced into vehicles. A typical EPS system utilizes an electric motor operatively connected to the steering column or steering gear assembly to provide the assist to the driver. The electric motor is typically controlled by a controller including power circuitry (e.g., power MOSFETs). The motor assist torque is controlled by the controller based on a variety of vehicle and system inputs. These inputs may include vehicle speed, handwheel torque, steering angle, etc. Additionally, the motor toque may be controlled as a function of system voltage, motor position, and motor velocity. Since motor velocity is a resultant of the controlled motor torque and the vehicle operation condition, the motor velocity is not directly controlled. Therefore, the motor velocity needs to be measured if it is used as part of the overall control strategy. Unfortunately, velocity measurement errors (due to accuracy or signal latency), may lead to an incorrect amount of electrical current being applied to the motor. Furthermore, direct measurement of velocity can be cost prohibitive. Therefore, other velocity measurement techniques are often used to calculate (or estimate) the motor velocity.

The invention of the subject application solves this and other problems.

SUMMARY OF THE INVENTION AND ADVANTAGES

The subject invention discloses a method of estimating velocity of an electric motor implemented in an electric power steering system. The method utilizes a computer and includes the step of obtaining a first representation of the velocity of the electric motor from a first velocity signal having a first set of characteristics. The method also includes the step of obtaining a second representation of the velocity of the electric motor from a second velocity signal having a second set of characteristics. The second set of characteristics is different from the first set of characteristics. A rate of change of the velocity of the electric motor is computed based on the first and second representations of the velocity. The method also includes the step of determining the velocity of the electric motor based on the rate of change of the velocity of the electric motor, the first representation of the velocity of the electric motor, and the second representation of the velocity of the electric motor to produce the estimated velocity of the electric motor.

Furthermore, the desired output of the electric motor, which is based at least in part on the speed of the vehicle, may be maintained by adjusting the electric current provided to the electric motor based on the estimated velocity of the electric motor and the desired output of the electric motor.

As such, the proper amount of current is sent to the electric motor based on the desired velocity of the electric motor. This ensures that current handling capabilities of a controller and/or associated power circuits are not exceeded. Furthermore, the controller, power circuits, and other components are protected from over heating and Electromagnetic compatibility issues.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, a method 100 of estimating velocity of an electric motor 10 operated by an electric power steering (EPS) system 12 is shown herein.

Figure 1:
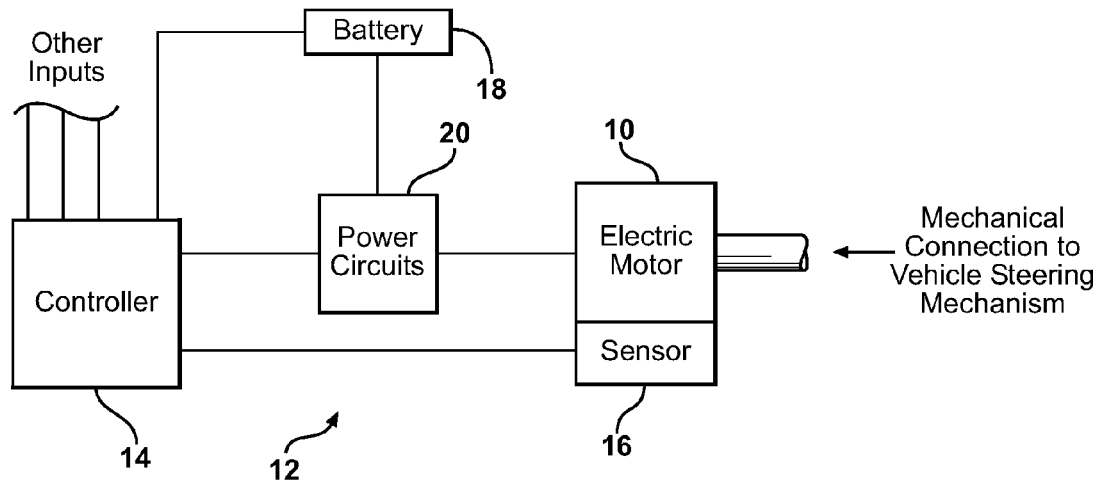
FIG. 1 is a block schematic diagram of an electric power steering (EPS) system utilizing a single electric motor sensor.

The EPS system 12 is used to provide assistance in the turning of the wheels (not shown) of a vehicle (not shown). This is typically accomplished by connection of the electric motor 10 to a steering mechanism (not shown) of the vehicle. A desired output (i.e., torque and velocity) of the electric motor 10 is based on a variety of vehicle factors, including, but not limited to, the speed of the vehicle, the angle and torque of a steering column, and the gear ratio between the electric motor 10 and the steering mechanism. As shown in FIG. 1, the EPS system 12 includes at least one controller 14 to operate the system 12. The at least one controller 14 may be a single microprocessor, microcontroller, application specific integrated circuit, other electrical device capable of computing as known to those skilled in the art. Furthermore, the at least one controller 14 may be implemented with multiple microprocessors, etc. However, for the purposes of clarity, the at least one controller 14 will be referred to hereafter simply as the controller 14.

In the illustrated embodiment, the vehicle includes a battery 18 used as an electric power source. Of course, in other embodiments (not shown), other power sources may supplement and/or substitute for the battery 18. The battery 18 is electrically connected to the controller 14 and the motor 10 for providing electrical power thereto. In the illustrated embodiments, the system 12 includes at least one power circuit 20 electrically connected to the battery 18, the controller 14, and the motor 10, such that controller 14 and the power circuit 20 can control the amount of electrical power that is delivered to the motor 10.

The controller 14 may be in communication with various vehicle speed sensors (not shown) and steering mechanism sensors (not shown) to produce the speed of the vehicle and the angle and torque of the steering column mentioned above. The controller 14 also receives an input from at least one electric motor sensor 16. The at least one electric motor sensor 16 may be a position sensor, a tachometer, or other device known to those skilled in the art for sensing the rotational position and/or speed of the motor 10. The at least one electric motor sensor 16 produces at least one electric motor sensor signal that is communicated to the controller 14.

Figure 2:
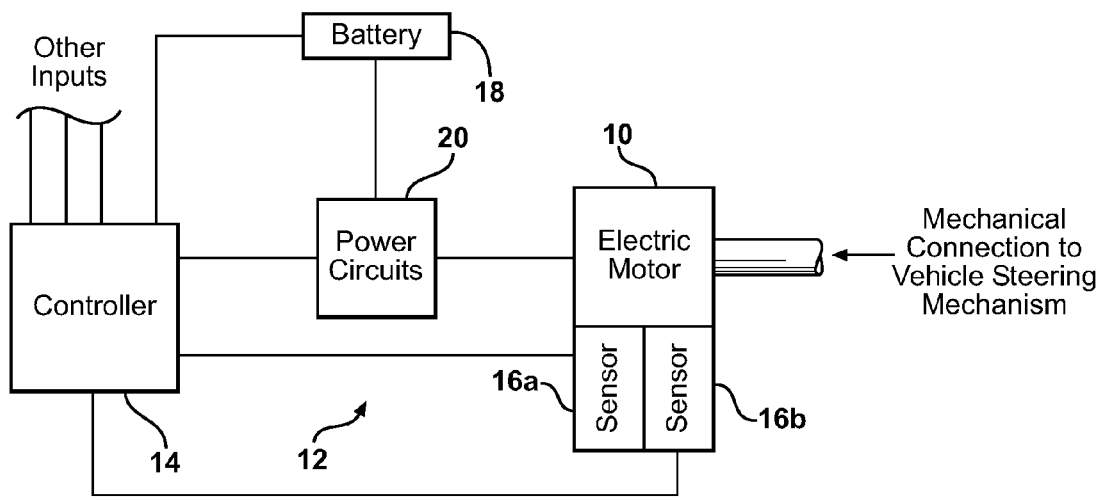
FIG. 2 is a block schematic diagram of the EPS system utilizing a plurality of electric motor sensors.

In the embodiment illustrated in FIG. 1, a single sensor 16 is utilized. The use of only one sensor 16 is often necessitated by cost concerns. However, in other embodiments, as illustrated in FIG. 2, multiple sensors 16a, 16b may be utilized, such that a plurality of electric motor sensor signals is produced.

The electric current running through the electric motor 10 can be calculated with the equation $$I_{motor} = \frac{(V_{Applied} - E_g)}{R}, \quad (1)$$

where $I_{motor}$ is the current running through the motor 10 (i.e., the motor current), $V_{Applied}$ is the voltage applied to the motor 10, R is the resistance of the motor 10, and $E_g$ is generated voltage of the motor 10, also referred to as the back EMF of the motor 10.

The generated voltage ($E_g$) of the motor 10 can be calculated with the equation $$E_g = K_e \cdot \omega, \quad (2)$$

where $K_e$ is the back EMF constant of the motor 10 and $\omega$ is the rotational speed of the motor 10. The torque ($T_{motor}$) of the motor 10 can be calculated with the equation $$T_{motor} = K_t \cdot I_{motor}, \quad (3)$$

where $K_t$ is the torque constant of the motor 10.

The amount of current that must be applied to operate the motor 10 at a certain speed can be calculated by combining equations (1) and (2) to produce the equation $$I_{motor} = \frac{(V_{Applied} - K_e \cdot \omega)}{R}. \quad (4)$$

As such, it is critical to have an accurate estimate of the actual rotational speed of the motor 10, i.e., the actual velocity of the motor 10, in order to determine the current that is actually flowing through the motor 10, i.e., the actual current. If this actual current is less than the desired current, then reduced output of the motor 10 will occur, resulting in decreased motor torque and/or decreased motor speed. Conversely, if the actual current is greater than the desired current, then increased motor torque and/or increased motor speed will occur. Furthermore, this increased transient current will require additional current handling capability by the controller 14 and/or the at least one power circuit 20. Moreover, this high transient current may cause other problems such as, but not limited to, durability of the various components, over heating of the components, and electromagnetic compatibility (EMC) issues due to electromagnetic emissions.

The controller 14 employs a plurality of velocity signal processing algorithms to process the at least one electric motor sensor signal received by the controller 14. In the embodiment illustrated in FIG. 3, the processor 14 utilizes a first velocity signal processing algorithm to generate a first velocity signal and a second velocity signal processing algorithm to generate a second velocity signal from a single electric motor sensor signal. That is, the first and second velocity signals are obtained from a single sensor 16 monitoring rotational position of the electric motor 10. However, the controller 14 may employ more than two signal processing algorithms and, as stated above, more than one electric motor sensor signal may be utilized. For example, the first velocity signal is obtained from a first sensor 16a monitoring rotational position of the electric motor 10 and the second velocity signal is obtained from a second sensor 16b monitoring rotational position of the electric motor 10.

Each velocity signal has a set of characteristics. The characteristics of each signal may include, but are not limited to, resolution, bandwidth (i.e., signal lag or update speed), range, and accuracy. In the illustrated embodiment, the first velocity signal has a first set of characteristics and the second velocity signal has second set of characteristics that are different from the first set of characteristics.

In the illustrated embodiment, the characteristics of the velocity signals each have an update speed. Specifically, the first set of characteristics has a first update speed and the second set of characteristics has a second update speed. More specifically, the first update speed is slower than the second update speed. That is, the first velocity signal is slower than second velocity signal. Said another way, there exists more lag in the first velocity signal than the second velocity signal. At the same time, the first velocity signal has higher resolution than the second velocity signal.

Figure 3:
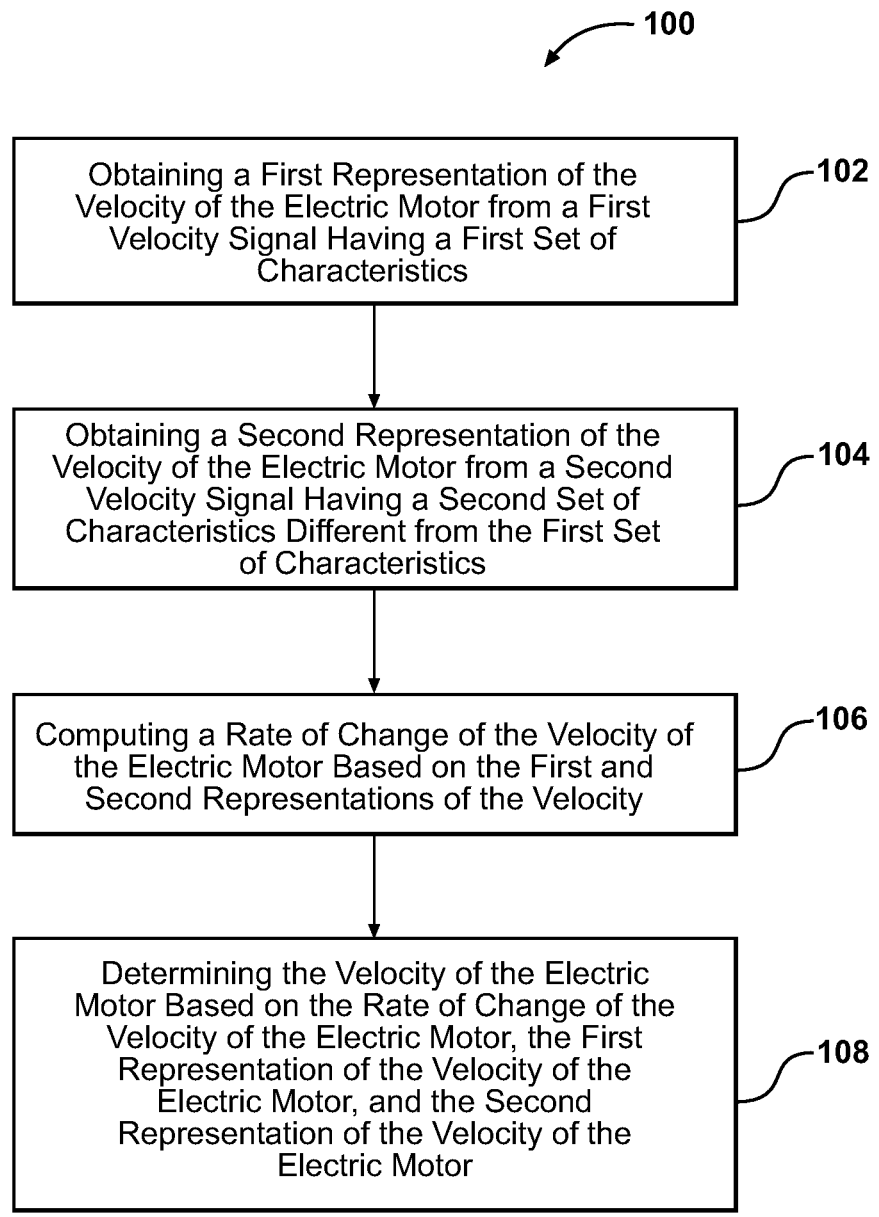
FIG. 3 is a chart showing steps of a method of the present invention.

Turning now to the method 100 of the subject invention, and with references to FIG. 3, the method includes the steps 102, 104 of obtaining a first representation of the velocity of the electric motor from the first velocity signal and obtaining a second representation of the velocity of the electric motor from a second velocity signal. The first and second representations of the velocity are single data points obtained from the respective first and second velocity signals. In the illustrated embodiment, these representations of the velocity are generated by examination of the first and second velocity signals by the velocity estimation algorithm of the controller 14.

The method further includes the step 106 of computing a rate of change of the velocity of the electric motor based on the first and second representations of the velocity. The rate of change of the velocity is also commonly referred to as either acceleration or deceleration, depending on the whether the rate of change of the velocity is positive or negative. Accordingly, the method 100 also may include the step (not shown) of ascertaining whether the rate of change of the velocity of the electric motor represents an acceleration of the electric motor or a deceleration of the electric motor.

Figure 4:
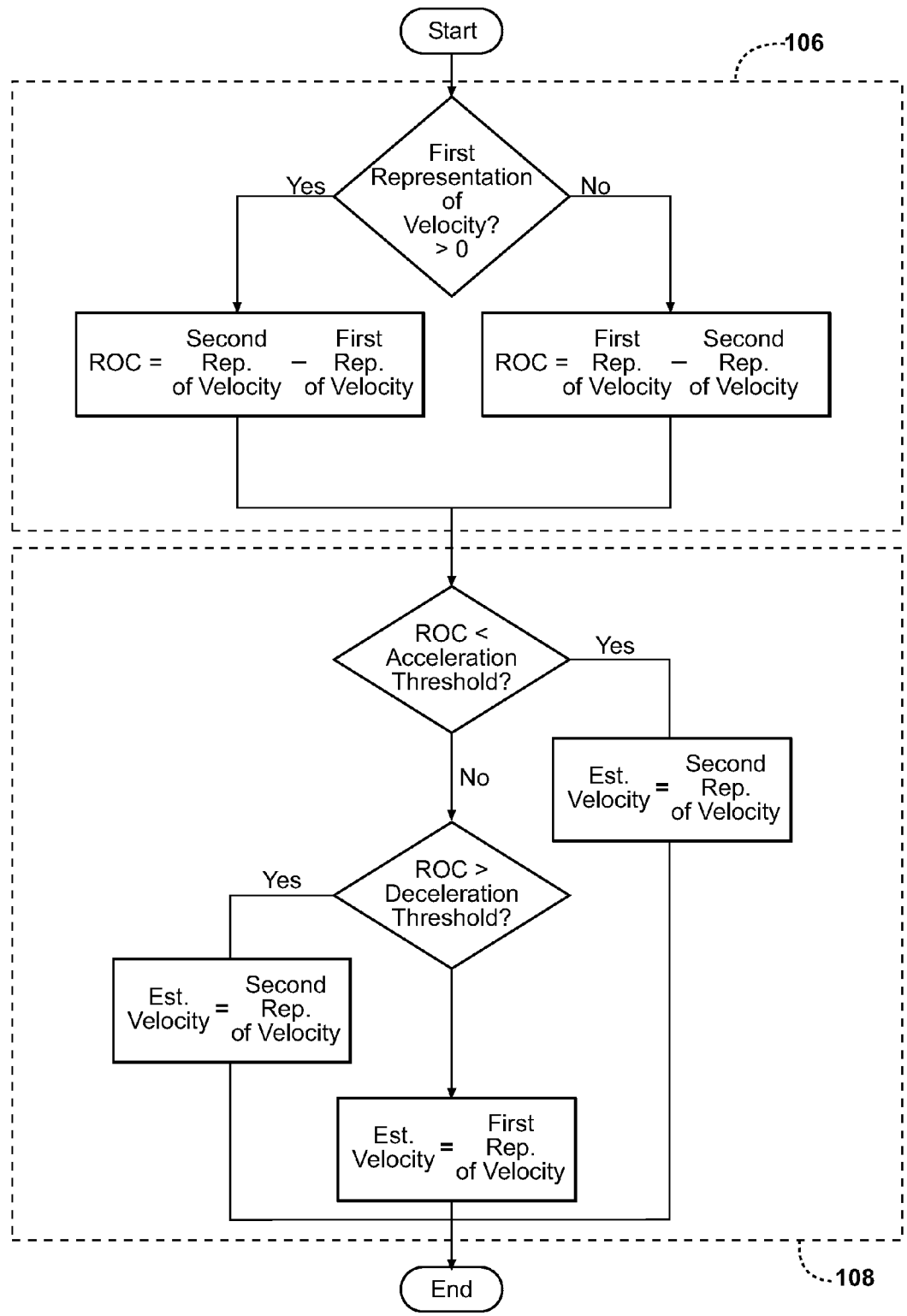
FIG. 4 is a flowchart showing details of steps of a first embodiment of the method of the present invention.
Figure 5:
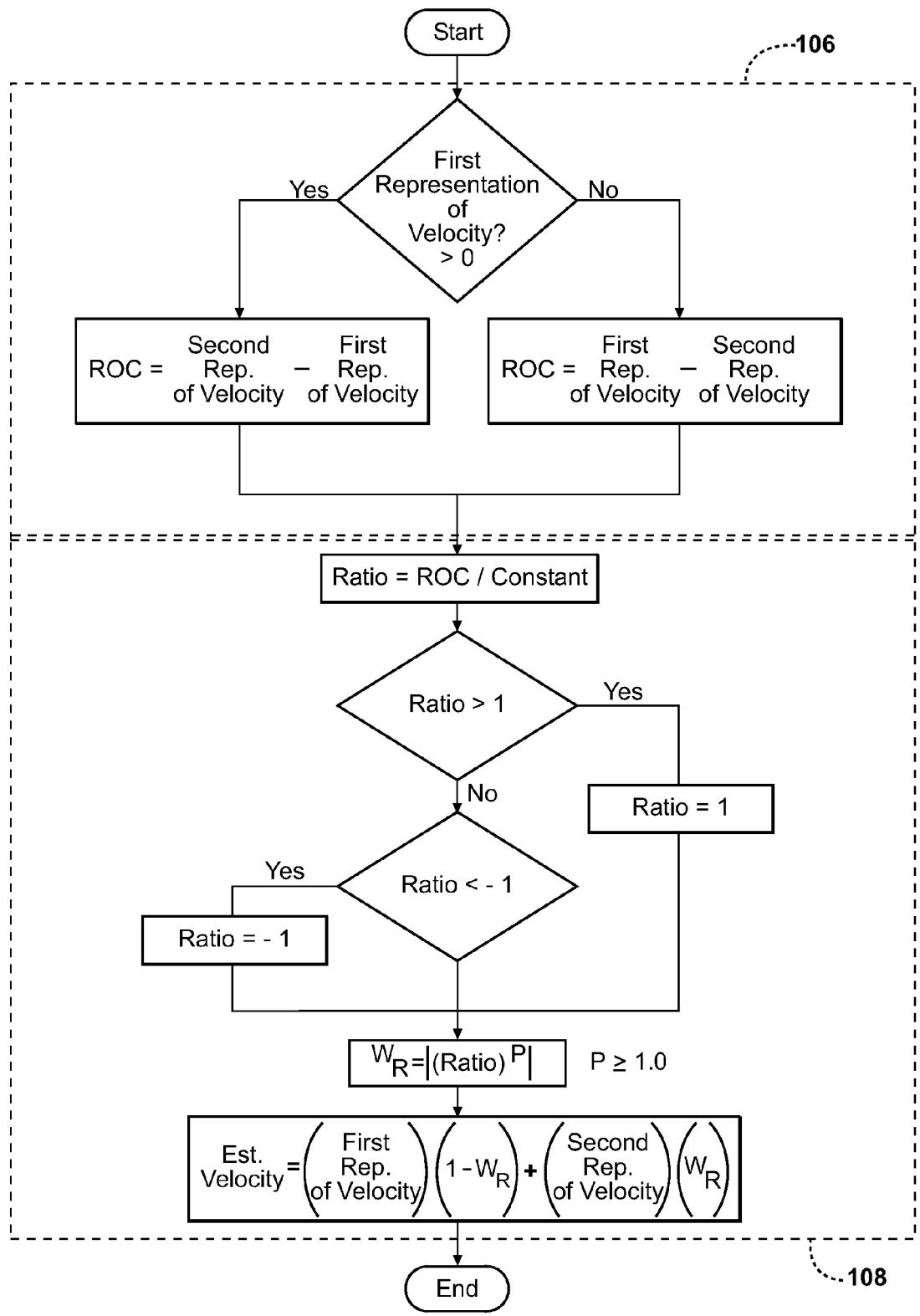
FIG. 5 is a flowchart showing details of steps of a second embodiment of the method of the present invention.

In the illustrated embodiments, the step 106 of computing the rate of change of the velocity of the electric motor is further defined as subtracting one of the first and second representations of the velocity from the other of the first and second representations of velocity. With reference to FIGS. 4 and 5, if the first representation of velocity is greater than zero, then the rate of change equals the second representation of velocity minus the first representation of velocity. If the first representation of velocity is less than or equal to zero, then the rate of change equals the first representation of velocity minus the second representation of velocity.

The method 100 also includes the step 108 of determining the velocity of the electric motor based on the rate of change of the velocity of the electric motor, the first representation of the velocity of the electric motor, and the second representation of the velocity of the electric motor to produce the estimated velocity of the electric motor. The subject invention illustrates two embodiments to accomplishing this step 110.

In a first embodiment, as shown in FIG. 4, the step 108 of determining the velocity of the electric motor is further defined as selecting either the first representation of velocity or the second representation of velocity to be the estimated velocity of the electric motor based on the computed rate of change of velocity. More specifically, the rate of change is compared first to an acceleration threshold value. This acceleration threshold value is a predetermined constant. If the rate of change is greater than the acceleration threshold value, then the estimated velocity is set to be equal to the second representation of velocity. If the rate of change is not greater than the acceleration threshold value, then the rate of change is compared to a deceleration threshold value. Likewise, this deceleration threshold value is a predetermined constant. If the rate of change is less than the deceleration threshold value, then the estimated velocity is set to be equal to the second representation of velocity. Otherwise, the estimated velocity is set to be equal to the first representation of velocity.

In a second embodiment, as shown in FIG. 5, the step 108 of determining the velocity of the electric motor is further defined as blending the first and second representations of the velocity of the electric motor based on the rate of change of the electric motor to calculate the estimated velocity of the electric motor. Said another way, the estimated velocity in the second embodiment, the first and second representations of the velocity are each weighted then summed together.

Specifically, the step 108 of determining the velocity in the second embodiment begins with computing a ratio (R) of the rate of change (i.e., acceleration or deceleration) to a predetermined constant. The step 108 then limits the computed ratio (R) to a value between 1 and −1 by setting the ratio (R) to 1 if it is computed higher than 1 or to −1 if it is computed less than −1. A relative weight value ($W_R$) is then computed using the equation $$W_R = |R^P|,$$

where P is a constant exponent value that is limited to even positive values greater or equal to 1.0. The estimated velocity ($v_{est}$) is then calculated using the equation $$v_{est} = v_1(1-W_R) + v_2 W_R,$$

where $v_1$ is the first representation of velocity and $v_2$ is the second representation of velocity.

The method 100 may also include further iterations to more accurately calculate the estimated velocity of the motor 10. The method 100 may include the step (not shown) of obtaining a third representation of the velocity of the electric motor 10 from a third velocity signal. The third velocity signal has a third set of characteristics different from the first and/or second set of characteristics. The method 100 may then also include the step (not shown) of computing a revised rate of change of the velocity of the electric motor. The revised rate of change of the velocity of the electric motor 10 is based on the estimated velocity and the third representation of the velocity.

The method 100 may then further include the step (not shown) of determining the velocity of the electric motor 10 based on the revised rate of change, the third representation, and the estimated velocity to produce a revised estimate of velocity of the electric motor 10. As with step 108 described above, this step may be performed using multiple techniques. In a first technique, analogous to the first embodiment of step 108 described above, the revised estimate of velocity is set to be equal to either the third representation of velocity or the estimated velocity, based on how the revised rate of change compares to the acceleration threshold or the deceleration threshold. In a second technique, analogous to the second embodiment of step 108 described above, the revised estimated velocity ($v_{est2}$) is calculated using the equation $$v_{est2} = v_{est}(1-W_R) + v_3 W_R$$

where $v_3$ is the third representation of velocity. Of course, these further iterations can be repeated times with additional representations of the velocity to more accurately determine the actual velocity of the electric motor 10.

Once the estimated velocity (or revised estimated velocity) is determined, the electric current provided to the electric motor may be adjusted. This adjustment is based on the estimated velocity of the electric motor and the desired output of the electric motor. For instance, if a rapid deceleration (i.e., negative rate of change) is indicated, the estimated velocity will switch (or blend) to the faster of the representations of velocity. The effect of the faster (less lag) representation of velocity will be to reduce the motor current as compared to the motor current that would have been produced if the slower representation of velocity had been used. Likewise, if a rapid acceleration (i.e., positive rate of change) of the motor 10 is indicated, the estimated velocity will switch (or blend) to the faster of the representations of velocity. The effect of the faster (less lag) representation of velocity will be to increase the motor current as compared to the motor current that would have been produce if the slower representation of velocity had been used.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method of estimating velocity of an electric motor implemented in an electric power steering system utilizing a computer, and determining a desired angular velocity of the electric motor based at least in part upon a variable speed, said method comprising the steps of:
    obtaining a first representation of the angular velocity of the electric motor from a first velocity signal;
    obtaining a second representation of the angular velocity of the electric motor from a second velocity signal;
    computing a rate of change of the velocity of the electric motor based on the first and second representations of the angular velocity; and
    determining the velocity of the electric motor based on the rate of change of the velocity of the electric motor, the first representation of the angular velocity of the electric motor, and the second representation of the angular velocity of the electric motor to produce the estimated velocity of the electric motor.

2. A method as set forth in claim 1 wherein said step of determining the velocity of the electric motor is further defined as selecting either the first representation of angular velocity or the second representation of angular velocity to be the estimated velocity of the electric motor based on the computed rate of change of velocity.

3. A method as set forth in claim 1 wherein said step of determining the velocity of the electric motor is further defined as blending the first and second representations of the angular velocity of the electric motor based on the rate of change of the electric motor to calculate the estimated velocity of the electric motor.

4. A method as set forth in claim 3 further comprising the step of determining relative weight of each of the first and second representations of velocity based on the computed rate of change of the velocity.

5. A method as set forth in claim 1 wherein said method further includes the step of ascertaining whether the rate of change of the velocity of the electric motor represents an acceleration of the electric motor or a deceleration of the electric motor.

6. A method as set forth in claim 1 wherein said step of computing a rate of change of the velocity of the electric motor is further defined as subtracting one of the first and second representations of the angular velocity from the other of the first and second representations of the angular velocity to determine the rate of change of the velocity.

7. A method as set forth in claim 1 wherein the first and second velocity signals are obtained from a single sensor monitoring rotational position of the electric motor.

8. A method as set forth in claim 1 wherein the first angular velocity signal is obtained from a first sensor monitoring rotational position of the electric motor and the second angular velocity signal is obtained from a second sensor monitoring rotational position of the electric motor.

9. A method as set forth in claim 1 wherein a first set of characteristics of the first angular velocity signal includes a first update speed and a second set of characteristics of the second signal includes a second update angular velocity.

10. A method as set forth in claim 8 wherein first update speed is slower than the second update speed.

11. A method as set forth in claim 1 further comprising the steps of:
obtaining a third representation of the angular velocity of the electric motor from a third velocity signal; and
computing a revised rate of change of the velocity of the electric motor based on the estimated velocity and the third representation of the velocity.

12. A method as set forth in claim 11 further comprising the step of determining the velocity of the electric motor based on the revised rate of change, the third representation, and the estimated velocity to produce a revised estimate of velocity of the electric motor.

13. A method of controlling electric current provided to an electric motor implemented in an electric power steering system of a vehicle utilizing a computer, said method comprising the steps of:
determining a desired velocity of the electric motor based at least in part on speed of the vehicle;
obtaining a first representation of the velocity of the electric motor from a first velocity signal;
obtaining a second representation of the velocity of the electric motor from a second velocity signal different from the first velocity signal;
computing a rate of change of the velocity of the electric motor based on the first and second representations of the velocity;
determining the velocity of the electric motor based on the rate of change of the velocity of the electric motor, the first representation of the velocity of the electric motor, and the second representation of the velocity of the electric motor to produce the estimated velocity of the electric motor; and
adjusting the electric current provided to the electric motor based on the estimated velocity of the electric motor and the desired output of the electric motor.

14. A method as set forth in claim 13 wherein said step of adjusting the electric current is further defined as reducing the electric current provided to the electric motor in response to a rapid deceleration of the electric motor as indicated by the estimated velocity of the electric motor.

15. A method as set forth in claim 13 wherein said step of adjusting the electric current is further defined as increasing the electric current provided to the electric motor in response to a rapid acceleration of the electric motor as indicated by the estimated velocity of the electric motor.

16. A method as set forth in claim 13 wherein said step of determining the velocity of the electric motor is further defined as selecting either the first representation of velocity or the second representation of velocity to be the estimated velocity of the electric motor based on the computed rate of change of velocity.

17. A method as set forth in claim 13 wherein said step of determining the velocity of the electric motor is further defined as blending the first and second representations of the velocity of the electric motor based on the rate of change of the electric motor to calculate the estimated velocity of the electric motor.

* * * * *